United States Patent
Gao et al.

(10) Patent No.: US 7,484,173 B2
(45) Date of Patent: Jan. 27, 2009

(54) ALTERNATIVE KEY PAD LAYOUT FOR ENHANCED SECURITY

(75) Inventors: Jie Jenie Gao, Sugar Land, TX (US); Charles Ray Johns, Austin, TX (US); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/252,513

(22) Filed: Oct. 18, 2005

(65) Prior Publication Data

US 2007/0089164 A1    Apr. 19, 2007

(51) Int. Cl.
G06F 15/00    (2006.01)
G06F 17/00    (2006.01)

(52) U.S. Cl. ............................... 715/741; 715/773
(58) Field of Classification Search ............. 715/773, 715/741
See application file for complete search history.

(56) References Cited

U.S. PATENT DOCUMENTS 6,549,194 B1 * 4/2003 McIntyre et al. ............ 345/173

2003/0182558 A1 * 9/2003 Lazzaro et al. .............. 713/183
2004/0257238 A1 * 12/2004 De Jongh .................... 340/825
2005/0139658 A1 * 6/2005 Lambert et al. ........... 235/382.5
2005/0251752 A1 * 11/2005 Tan et al. .................... 715/741

OTHER PUBLICATIONS

Jim Bruene, The 10 Most significant Innovations & Developments of 2003, Jan. 7, 2004, Netbanker, pp. 1-11.*

* cited by examiner

*Primary Examiner*—Stephen S Hong
*Assistant Examiner*—Shen Shiau
(74) *Attorney, Agent, or Firm*—Van Leeuwen & Van Leeuwen; Matthew B. Talpis

(57) ABSTRACT

A method for providing an alternate keypad arrangement in a virtual keypad is presented. In the alternate keypad arrangement, the virtual keys are laid out in a non-sequential arrangement. In one embodiment, the labels displayed on the virtual keys appear sequential, however the values registered when the user presses the virtual key does not match the label and, hence, the values are laid out in a non-sequential manner. Using alternate keypad arrangements arranged in patterns enables the user to use a common pattern, or patterns easily remembered by the user, for a wide variety of authentication data used to access a wide variety of systems. Rather than remembering the specific PIN codes and passwords, the user simply remembers a pattern and selects virtual keys that match the pattern.

1 Claim, 8 Drawing Sheets

ALTERNATIVE KEY PAD LAYOUT FOR ENHANCED SECURITY

BACKGROUND OF THE INVENTION

1. Technical Field

The present invention relates in general to a system and method for providing an alternative key pad layout to increase security.

2. Description of the Related Art

Touch screen technology is utilized in a vast array of modern computer applications. These applications include automated teller machines (ATMs), check-in applications at airports, such as those used to print boarding passes, as well as many others. In these applications, the user often has the ability to select from a list of languages so that the information that appears is displayed in a language familiar to the user. In many touch screen applications, a physical keyboard or keypad is replaced with a virtual keyboard or keypad that is displayed on the display. If the user wants to press the one ("1") key, for example, the user touches a virtual key that appears on the display rather than pressing a physical "1" key on a keyboard or keypad.

A depiction of a typical application utilizing a virtual keypad is shown in FIG. 1. FIG. 1 shows an Automated Teller Machine (ATM) application commonly used by millions of people everyday. The user starts by inserting his or her ATM card (100) into ATM terminal 110. In response, the ATM machine accesses computer network 120, such as a secure banking network, to interface with bank server 130 which has access to the customer's account information 140, including the user's personal identification number (PIN), often referred to as a "PIN code," or "password."

Virtual keypad 150 is displayed on terminal 110's display screen. As shown, the virtual keypad is arranged in a substantially similar fashion to physical keypads that were more commonly used before the advent and large-scale use of virtual keypads. The numbers in virtual keypad 150 are displayed in a numerical order. In the example shown, the numbers 1 through 3 appear in consecutive order on the first line of the display, numbers 4 through 6 on the second line, numbers 7 through 9 on the third line, and special characters and zero ("0") on the fourth line. In addition, virtual keys for "OK" and "Cancel" are provided. If the user selected an alternative language, some of the keys displayed might be displayed in a non-English language. Other virtual keypad arrangements exist, such as displaying 1 through 5 on a first line and 6 through 0 on a second line, or displaying all ten digits consecutively (1, 2, 3, 4, 5, 6, 7, 8, 9, 0) on a single line. However, one constant in the prior art is that the keys are displayed in a numerical order. In the example shown, the user enters his or her PIN code ("1-9-2-7") as depicted by the arrows from one virtual key to the next.

The prior art's arrangement of virtual key in numeric order does allow users to easily find keys, much like finding keys on a traditional telephone. In addition, from past use with physical keypads, users are familiar with the position of keys as depicted in virtual keypad 150. The use of traditional key layouts on virtual keypads does however, present challenges.

A challenge with using traditional virtual keypads relates to the fact that today's modern society often encumbers users with a multitude of PIN codes and passwords. Remembering these various PIN codes and passwords can be problematic. What is needed, therefore, is a system and method that provides an alternative keypad layout in which the virtual keys displayed on the virtual keypad are in a non-sequential layout. Furthermore, what is needed is a system and method that allows the user to select a keypad arrangement that is more easily remembered by the user.

SUMMARY

It has been discovered that the aforementioned challenges are resolved using a system and method that provides an alternate keypad arrangement displayed on a virtual keypad for entry of the user's authentication data, such as the user's PIN code or password. In the alternate keypad arrangement, the virtual keys are laid out in a non-sequential arrangement. In one embodiment, the labels displayed on the virtual keys appear sequential, however the values registered when the user presses the virtual key does not match the label and, hence, the values are laid out in a non-sequential manner.

The user can configure the alternate keypad arrangement to use either an arrangement of virtual keys where the value of the keys match the label displayed for the keys or an arrangement of virtual keys with labels that are displayed sequentially but with values that do not match the labels and that form a pattern. For example, the user can choose a vertical pattern down the center of a keypad by choosing the characters "2-5-8-0" and assign these The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
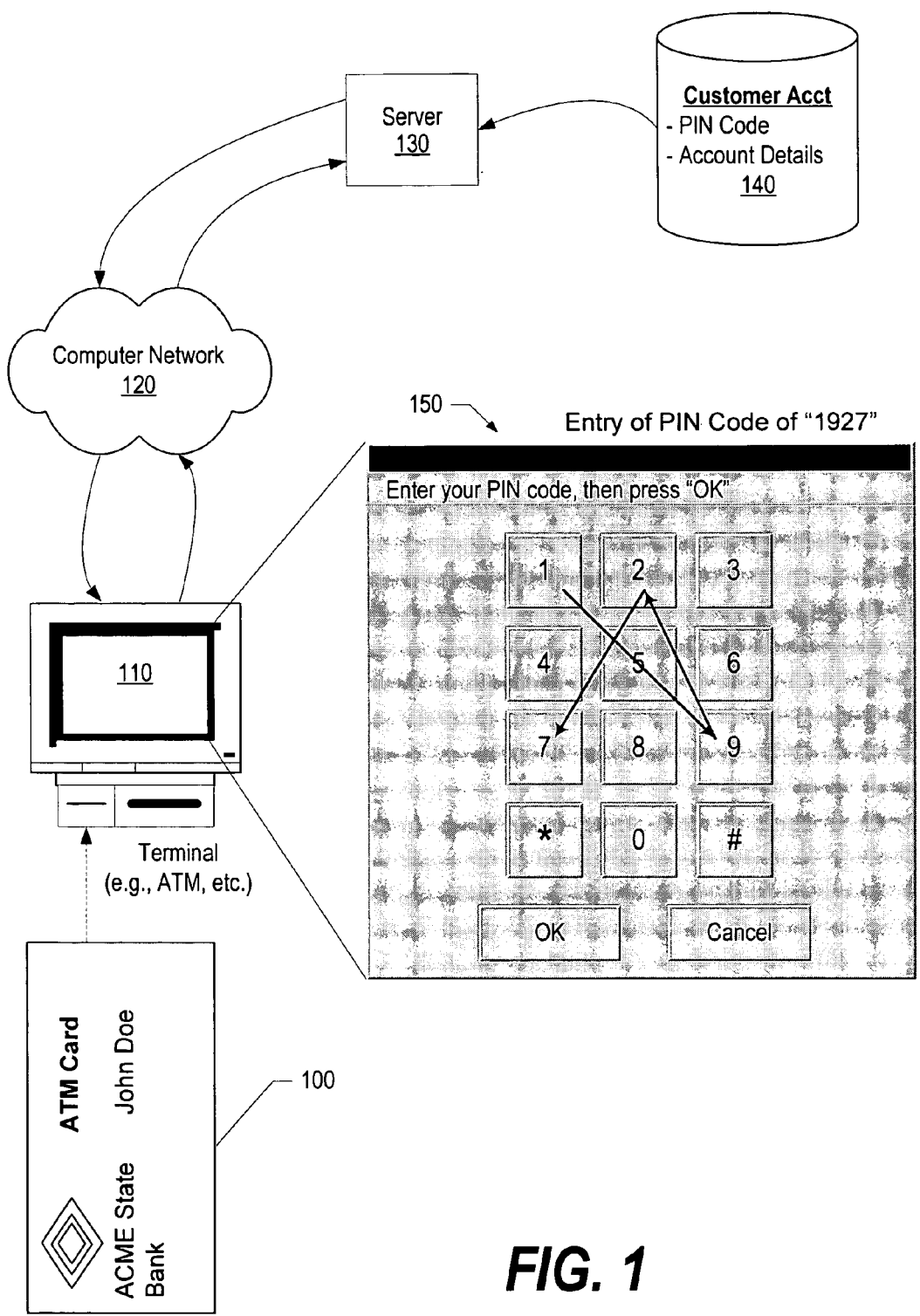
FIG. 1 is a prior art diagram of keypad entry of a password using a standard keypad layout.

FIG. 1 is a prior art diagram of keypad entry of a password using a standard keypad layout, and is described in the Description of the Related Art section, above.

Figure 2:
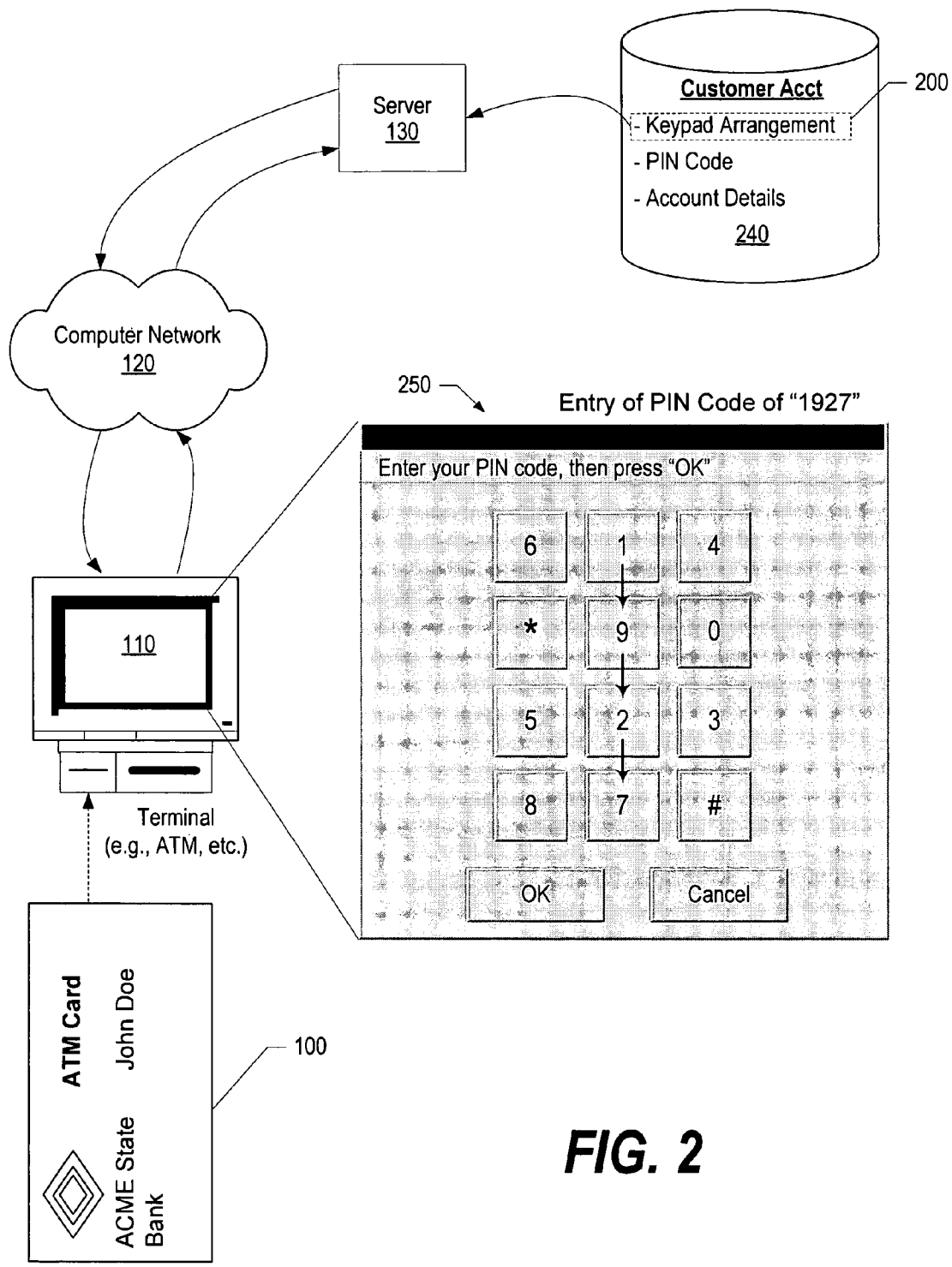
FIG. 2 is a diagram showing entry of a password using a user-selected alternate keypad.

FIG. 2 is a diagram showing entry of a password using a user-selected alternate keypad. The user makes a request of the system. In a banking embodiment, the user might start the request by inserting ATM card 100 into ATM bank terminal 110. The ATM card includes user identification information embodied on the card. In a non-banking embodiment, the user might enter a user identifier either using a keyboard or virtual keypad or providing the user identifier on a smart card or other nonvolatile storage device.

In one embodiment, the user identifier is transmitted from terminal 110 through computer network 120 to server 130 in order to retrieve customer account information 240, which includes keyboard layout 200 that is preferred by the user. The keyboard layout that includes the alternate keypad arrangement is retrieved by server 130 and transmitted back through computer network 120 to terminal 110 that is being used by the user. In another embodiment, the keyboard layout is embodied on the user's ATM card so that the alternate keypad arrangement can be retrieved more quickly and does not add network traffic in order to retrieve the alternate keypad arrangement.

After the virtual keypad layout has been retrieved at terminal 110 (either from a network-connected server or from a user-controlled media device such as an ATM card or a smart card), the alternate keypad arrangement is displayed on the display of terminal 110. In the example shown in FIG. 2, the user's PIN code is "1927" and the alternate keypad arrangement 250 is displayed so that these numbers fall in a vertical pattern down the middle of the display. While the alphanumeric keys on the virtual keypad are laid out in a non-sequential manner (i.e., the first row reads "6-1-4" rather than "1-2-3"), the user can readily enter his or her PIN code by remembering the pattern (i.e., vertical order from top to bottom) in which the PIN code is displayed. By using an alternate keypad arrangement, the user can have different passwords or PIN codes (collectively referred to as "authentication data") in different applications but remember the different PIN codes/authentication data because of the keypad arrangement. For example, in another application, the user's PIN code might be "8462" and the user can select an alternate keypad arrangement so that these numbers are displayed vertically from top to bottom with other numbers and alphanumeric keys arranged in a non-sequential manner. To further enhance security, more elaborate patterns can be employed, such as "Z" shapes, etc.

Figure 3:
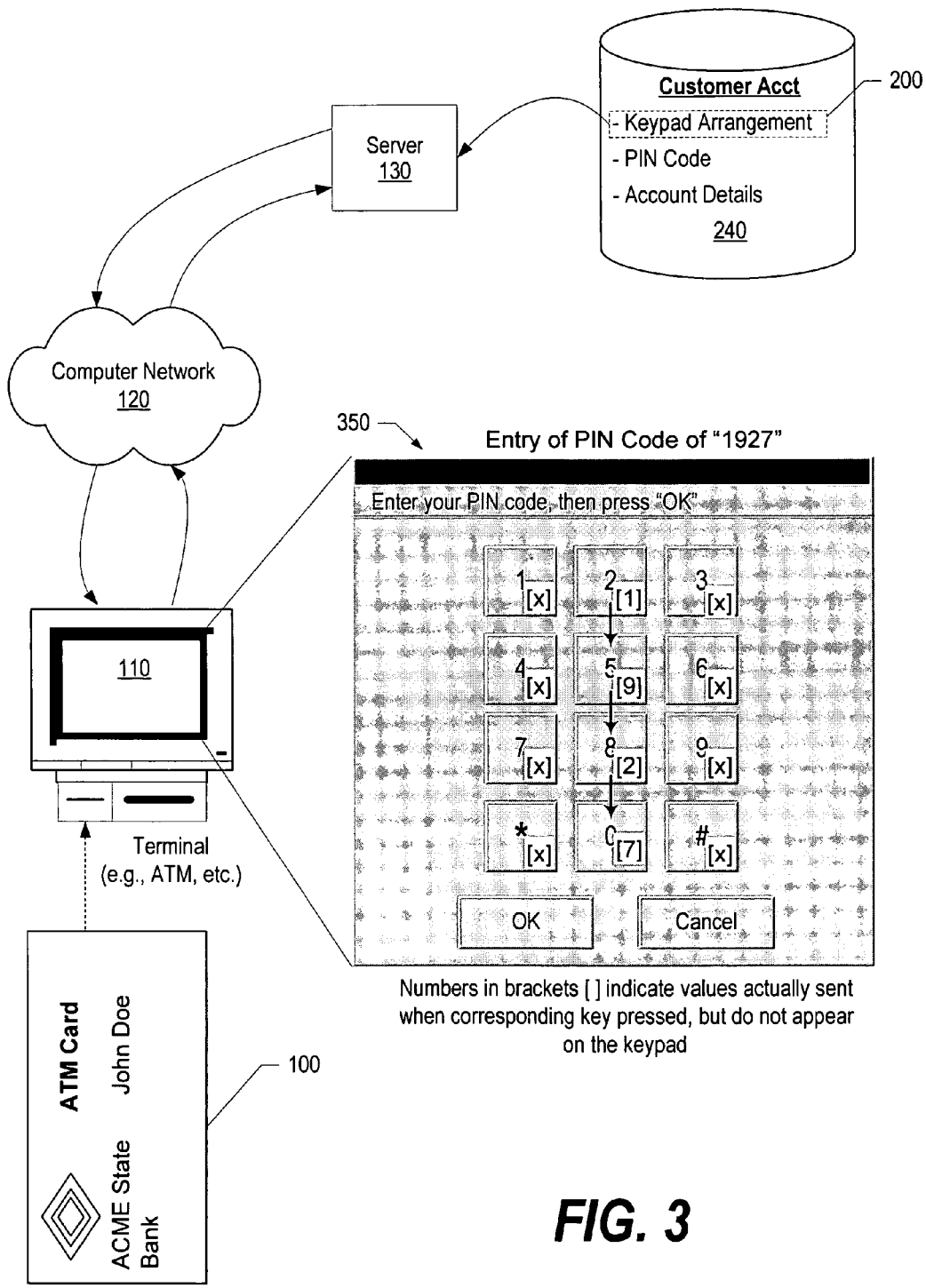
FIG. 3 is a diagram showing entry of a password using a user-selected pattern where the numbers of the pattern do not align with the numbers displayed on the keypad.

FIG. 3 is a diagram showing entry of a password using a user-selected pattern where the values of the alphanumeric keys on the virtual keypad, when selected, do not align with the numbers displayed on keypad 350. The retrieval of the user identification information is the same as that shown in FIG. 2. However, in FIG. 3, rather than the keypad labels being displayed in a non-sequential fashion, in FIG. 2, the alphanumeric key values are laid out in a non-sequential manner. In particular, the value of the keys on the first row are undefined ("x")—"1"—undefined ("x"), rather than traditional values of 1, 2, and 3. In the example shown, in order to enter the PIN code of "1-9-2-7", the user presses the keys on the virtual keypad labeled 2-5-8-0, with the alphanumeric key labeled "2" mapped to the value of "1," the alphanumeric key labeled "5" mapped to the value of "9," the alphanumeric key labeled "8" mapped to the value of "2," and the alphanumeric key labeled "0" mapped to the value of "7." Now when the user presses "2-5-8-0" the system actually receives the value "1-9-2-7" as the user's authentication data.

A common value could also be mapped to multiple keys, for example mapping both the "8" and the "0" to the value of "3." Like the virtual keypad shown in FIG. 2, the pattern used can be as elaborate as the user likes to increase security. Also, the user can have different authentication data for different applications that use the same pattern. For example, in a second application where the user's pin code is "8442," the value "8" would be mapped to the alphanumeric key labeled "2," the value "4" would be mapped to both the alphanumeric keys labeled "5" and "8," and the value "2" would be mapped to the alphanumeric key labeled "0." Now when the user presses "2-5-8-0" the system actually receives the value "8-4-4-2" as the user's authentication data.

The remaining keys not needed for the user to enter his or her authentication data can be assigned other values alphanumeric values or can be assigned no values (null).

Using "null" values can lessen network traffic because terminal 110 can sense that null values have been entered and, therefore, the authentication data is incorrect.

Terminal 110 can then reject the user's request without having to send the entered user authentication data through the network to the server for authentication.

Figure 4:
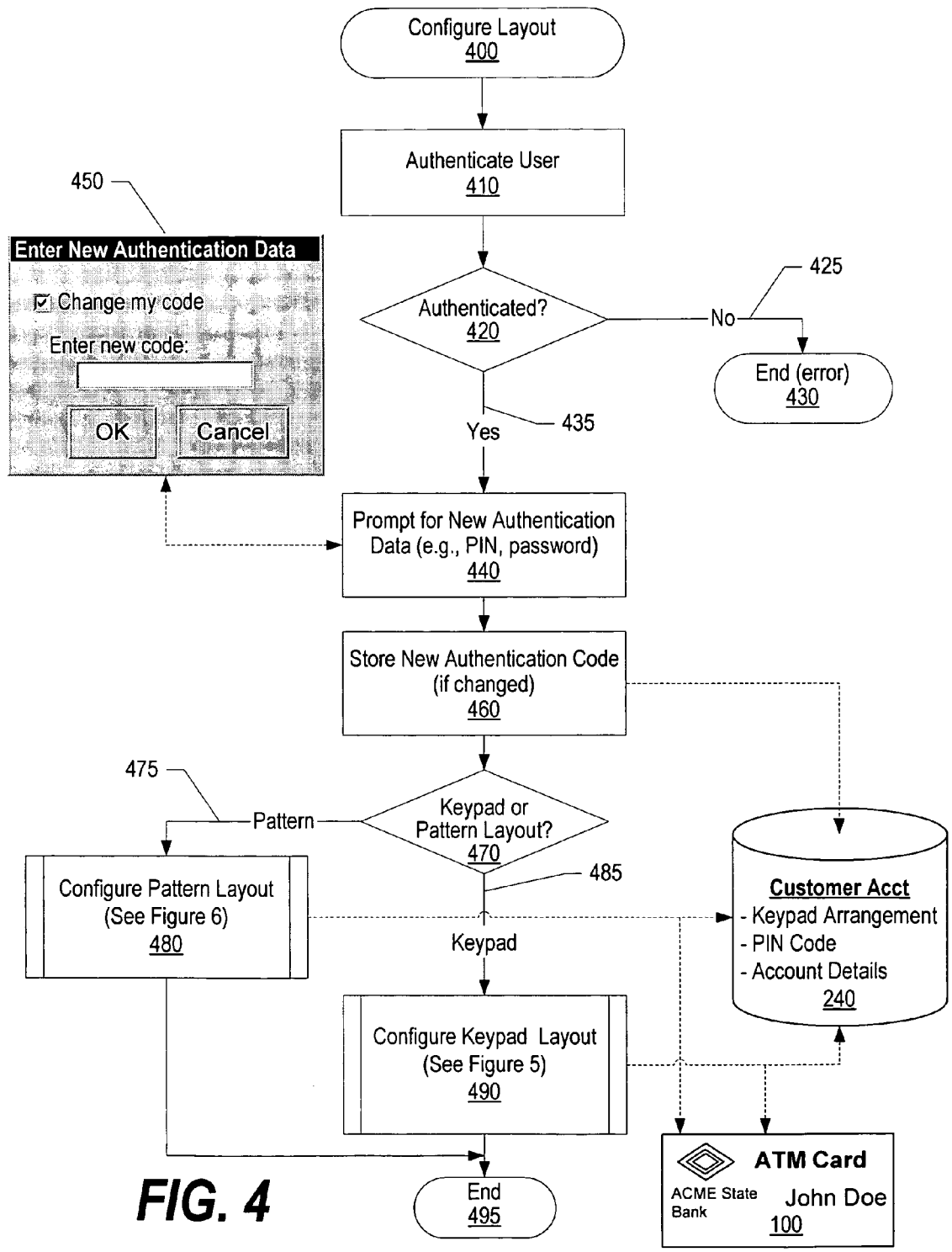
FIG. 4 is a flowchart showing steps taken by a user to configure a customized layout.

FIG. 4 is a flowchart showing steps taken by a user to configure a customized layout. Layout configuration processing commences at 400 whereupon, the user is authenticated at step 410 before being allowed to configure the user's layout. A determination is made as to whether the user is authenticated based upon the authentication data provided by the user (decision 420). If the user is not authenticated (e.g., the user provided an incorrect PIN code or password), decision 420 branches to "no" branch 425 and processing ends at 430.

On the other hand, if the user is authenticated, decision 420 branches to "yes" branch 435 whereupon, dialog window 450 is displayed that allows the user to change his or her authentication data. Dialog window 450 has a checkbox for indicating whether the user wants to change his or her authentication data and a textbox for entering the new authentication data. If the user changed the authentication data, the new authentication data is stored at step 460 in customer account data store 240.

A determination is made (decision 470) as to whether the user is changing the layout of the keypad (as shown in FIG. 2) or is changing the pattern (the values of the keys, as shown in FIG. 3). If the user is changing the keypad pattern, decision 470 branches to "pattern" branch 475 whereupon the user configures the pattern layout on the virtual keypad (predefined process 480, see FIG. 6 and corresponding text for processing details). If instead the user is changing the keypad layout, decision 470 branches to "keypad" branch 485 whereupon the user configures the keypad layout (predefined process 490, see FIG. 5 and corresponding text for processing details). The results of the pattern changes or the keypad changes are stored. The resulting alternate keypad arrangement is stored either to the user's account information data store 240 or to a nonvolatile storage device, such as ATM card 100 or a smart card that can be carried and used by the user.

Figure 5:
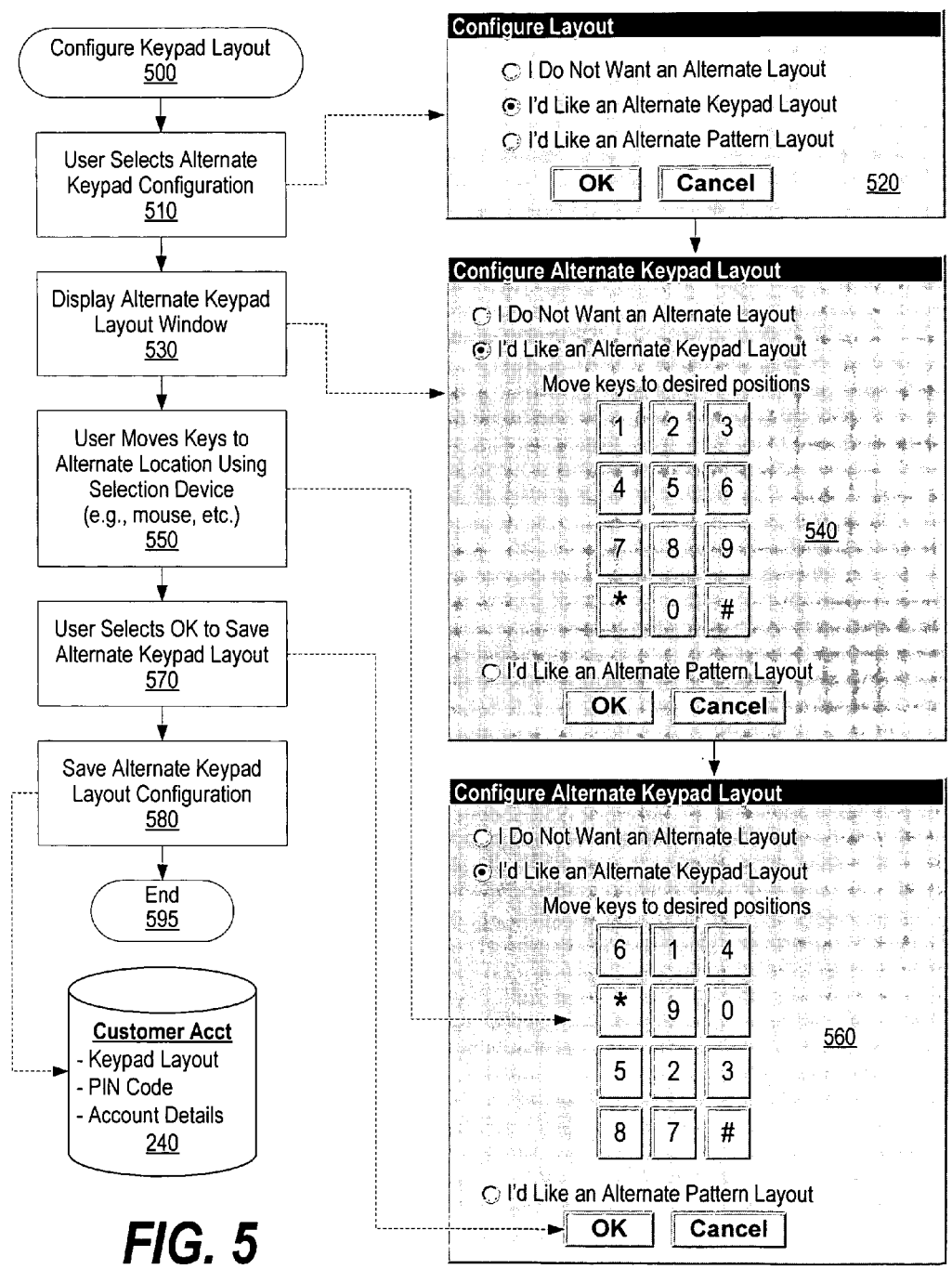
FIG. 5 is a flowchart showing steps taken by the user to configure a keyboard layout similar to the keypad depicted in FIG. 2.

FIG. 5 is a flowchart showing steps taken by the user to configure a keypad layout similar to the keypad depicted in FIG. 2. Processing commences at 500 whereupon dialog 520 is displayed to the user. At step 510, the user selects the radio button indicating that the user wants to use an alternate keypad layout arrangement.

In response to the user's selection, dialog panel 540 is displayed (step 530). Dialog panel 540 includes a graphical depiction of a virtual keypad with virtual alphanumeric keys. The user is instructed to move the keys displayed in dialog panel 540 into an alternate keypad arrangement preferred by the user. At step 550, the user moves the virtual alphanumeric keys displayed in dialog panel 540 to alternate locations to create the user's alternate keypad arrangement. The user moves the virtual keys by selecting the displayed keys, for example by clicking on a desired key with a mouse or pointing device or by tabbing to the desired key using a keyboard attached to the user's computer system. The results of the user moving the virtual keys into the alternate keypad arrangement is shown in resulting dialog 560.

Notice that the user has moved the keys so that the keys needed to enter the user's PIN code of "1927" are arranged in a pattern. In this case the pattern chosen by the user is a vertical arrangement where the keys are arranged from top to bottom in the middle of the virtual keypad. In this manner the user can use the same technique for other authentication data used with other applications so that, even though the authentication data used with the other applications uses different alphanumeric values, the arrangement of the authentication data can be made common or can be arranged in a manner easily remembered by the user. For example, the user can decide to have a bank ATM PIN code arranged as shown in dialog 560 and arrange for a PIN code used with a credit card or debit card to be arranged differently, such as horizontally, diagonally, etc.

At step 570, the user selects the "OK" button on dialog 560 to indicate that the user wants to save the displayed alternate keypad. If the user did not want to save the arrangement, the user simply selects the "Cancel" button instead. In response to the user requesting to save the alternate keypad arrangement (by clicking "OK"), the alternate keypad arrangement is saved at step 580. In one embodiment, the alternate keypad arrangement is saved to the user's account information data store 240. In an alternate embodiment, the alternate keypad arrangement is saved to a portable device that can be carried by the user, such as written to a smart card or to an ATM card, so that the user's alternate keypad arrangement is encoded on the portable device (or portable media). In the alternate embodiment, the system does not need to access the user's account information in order to display the alternate keypad arrangement, thus reducing network traffic and reducing any security exposure that may result from access of the user's account before the user has been authenticated. Processing thereafter ends at 595.

Figure 6:
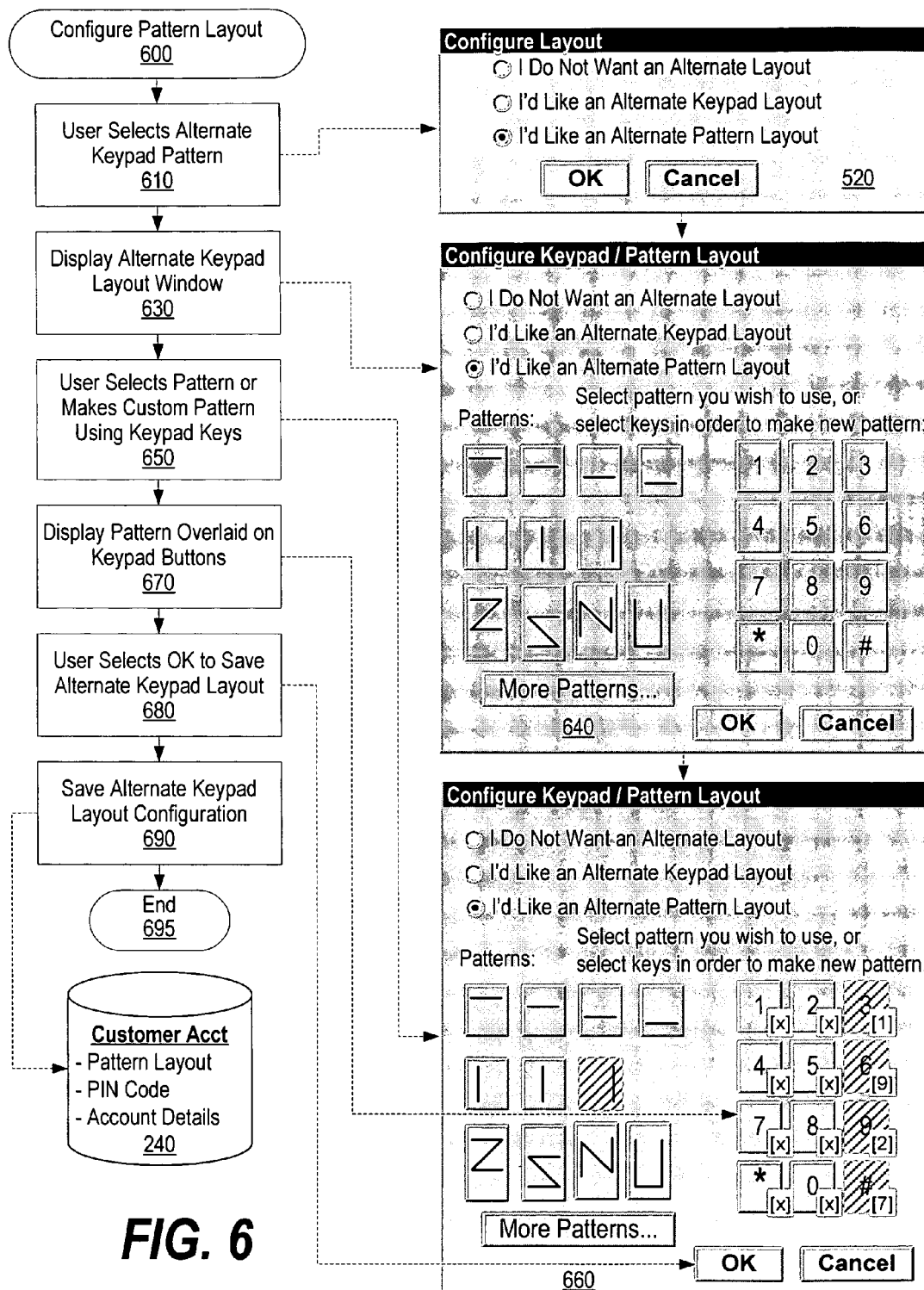
FIG. 6 is a flowchart showing steps taken by the user to configure a keyboard pattern layout similar to the keypad pattern depicted in FIG. 3.

FIG. 6 is a flowchart showing steps taken by the user to configure a keyboard pattern layout similar to the keypad pattern depicted in FIG. 3. Processing commences at 600 whereupon dialog 520 is displayed to the user. At step 610, the user selects the radio button indicating that the user wants to use an alternate pattern layout arrangement.

In response to the user's selection, dialog panel 640 is displayed (step 630). Dialog panel 640 includes a graphical depiction of a virtual keypad with virtual alphanumeric keys along with numerous available preset patterns. The user is instructed to select a pattern that he or she wishes to use or select from the virtual keys displayed in dialog panel 640 to create a new pattern. The pattern selected or created by the user will be the alternate keypad arrangement used by the user. At step 650, the selects one of the available patterns or makes a custom pattern by selecting keys from the virtual keypad displayed in dialog 640.

When a pattern has been selected or created, the user selects the "OK" button in dialog 640 whereupon, at step 670, dialog 660 is displayed. If a preset pattern was selected by the user, dialog 660 highlights the pattern—in this case the pattern is a vertical arrangement along the right side of the virtual keypad. In addition, the values that correspond to the alphanumeric keys displayed in the alternate keypad arrangement are overlaid on the keys. In the example shown, the user's authentication data (PIN code) value of "1927" has been mapped to the keys. In particular, the value "1" has been mapped to the "3" key, the value "9" has been mapped to the "6" key, the value "2" has been mapped to the "9" key, and the value "7" has been mapped to the pound sign key "#." As used herein, "alphanumeric" includes special character, such as the asterisk, pound sign, dollar sign, etc.

In this manner the user can use the same technique for other authentication data used with other applications so that, even though the authentication data used with the other applications uses different alphanumeric values, the arrangement of the authentication data can be made common or can be arranged in a manner easily remembered by the user. For example, the user can decide to have a bank ATM PIN code arranged as shown in dialog 660 and arrange for a PIN code used with a credit card or debit card to be arranged differently, such as horizontally, diagonally, etc. Also, in a different application, the keys "3-6-9-#" can be assigned to different authentication data. For example, if the user's debit card PIN code is "9-4-4-9" the value "9" would be mapped to both the "3" and the pound sign ("#") keys and the value "4" would be mapped to both the "6" and the "9" keys. In dialog 660, the keys not assigned to the user's authentication data values are either not defined or are assigned to other values.

At step 680, the user selects the "OK" button on dialog 660 to indicate that the user wants to save the displayed alternate keypad arrangement. If the user did not want to save the arrangement, the user simply selects the "Cancel" button instead. In response to the user requesting to save the alternate keypad arrangement (by clicking "OK"), the alternate keypad arrangement is saved at step 690. In one embodiment, the alternate keypad arrangement is saved to the user's account information data store 240. In an alternate embodiment, the alternate keypad arrangement is saved to a portable device that can be carried by the user, such as written to a smart card or to an ATM card, so that the user's alternate keypad arrangement is encoded on the portable device (or portable media). In the alternate embodiment, the system does not need to access the user's account information in order to display the alternate keypad arrangement, thus reducing network traffic and reducing any security exposure that may result from access of the user's account before the user has been authenticated. Processing thereafter ends at 695.

Figure 7:
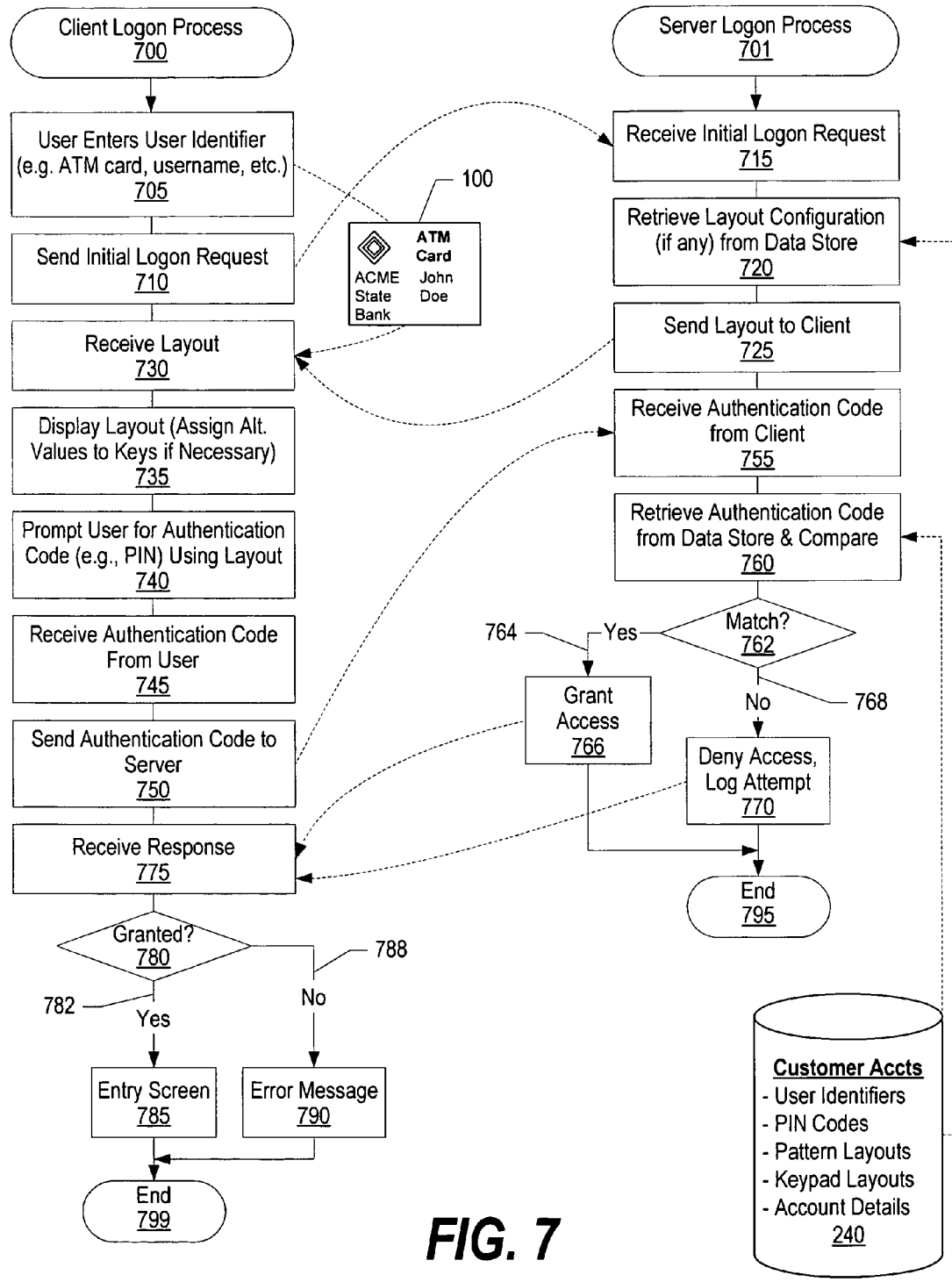
FIG. 7 is a flowchart showing a client logon process utilizing a customized layout as shown in FIGS. 2 and 3.

FIG. 7 is a flowchart showing a client logon process utilizing a customized layout as shown in FIGS. 2 and 3. Two embodiments of retrieving the user's alternate keypad arrangement are depicted in FIG. 7. In one embodiment, the user's alternate keypad arrangement is retrieved from the user's account information maintained by the server. In the alternate embodiment, the alternate keypad arrangement is retrieved from a portable media or device, such as a smart card or ATM card 100, carried by the user.

Client logon process commences at 700 whereupon, at step 705, the user provides user identification information, such as a user identifier entered in a display panel, or encoded on a device or media, such as ATM card 100 or a smart card.

In one embodiment, the alternate keypad arrangement is retrieved from a server. In this embodiment, an initial login request that includes the user's identification information is sent at 710 to the server. Server process 701 receives the request at step 715 and retrieves the user's alternate keypad arrangement at step 720 from customer account data store 240. At step 725, the retrieved alternate keypad arrangement is returned to the client over the computer network.

In an alternate embodiment, the user's alternate keypad arrangement is encoded on a media or device, such as ATM card 100 or a smart card. In this embodiment, the client process retrieves the alternate keypad arrangement without needing to communicate with the server.

At step 730, the user's alternate keypad arrangement is received, either from a portable media or device, such as ATM card 100, or through the computer network from the server. At step 735, the alternate keypad arrangement is displayed to the user on the virtual keypad. In one embodiment, the alternate keypad arrangement includes labels on the virtual keypad that are sequential displayed, however the values mapped to the keys displayed on the virtual keypad do not match the labels and the values are not arranged in a sequential fashion (see keypad 350 in FIG. 3 for an example). In another embodiment, the alternate keypad arrangement has values of the keys matching the labels displayed for the keys on the virtual keypad but the virtual keys themselves are not arranged in a sequential fashion (see keypad 250 in FIG. 2 for an example).

At step 740, the user is prompted to enter the user's authentication data using the alternate keypad arrangement displayed on the virtual keypad and the user's authentication data is received at step 745. The authentication data entered by the user is sent to the server for verification at step 750.

At step 755, the server receives the authentication data from the user over the computer network. At step 760, the user's actual authentication data is retrieved from customer account data store 240. A determination is made as to whether the received authentication data matches the authentication data stored in data store 240 (decision 762). If the data matches, decision 762 branches to "yes" branch 764 whereupon, at step 766, access is granted to the user. On the other hand, if the authentication data does not match, decision 762 branches to "no" branch 768 whereupon, at step 770 the user is denied access and the failed logon attempt is logged. Server logon processing ends at 795.

Returning to user logon processing, at step 775, the terminal or device being used by the user receives responsive data to the user's logon request. A determination is made as to whether the logon request was granted (decision 780). If the logon request was granted, decision 780 branches to "yes" branch 782 whereupon the user is presented with an entry screen (step 785) so that the user can interact with the application. On the other hand, if the logon request was not granted, decision 780 branches to "no" branch 788 whereupon an error message is displayed at step 790 and the user is not allowed access to the system. User processing thereafter ends at 799.

Figure 8:
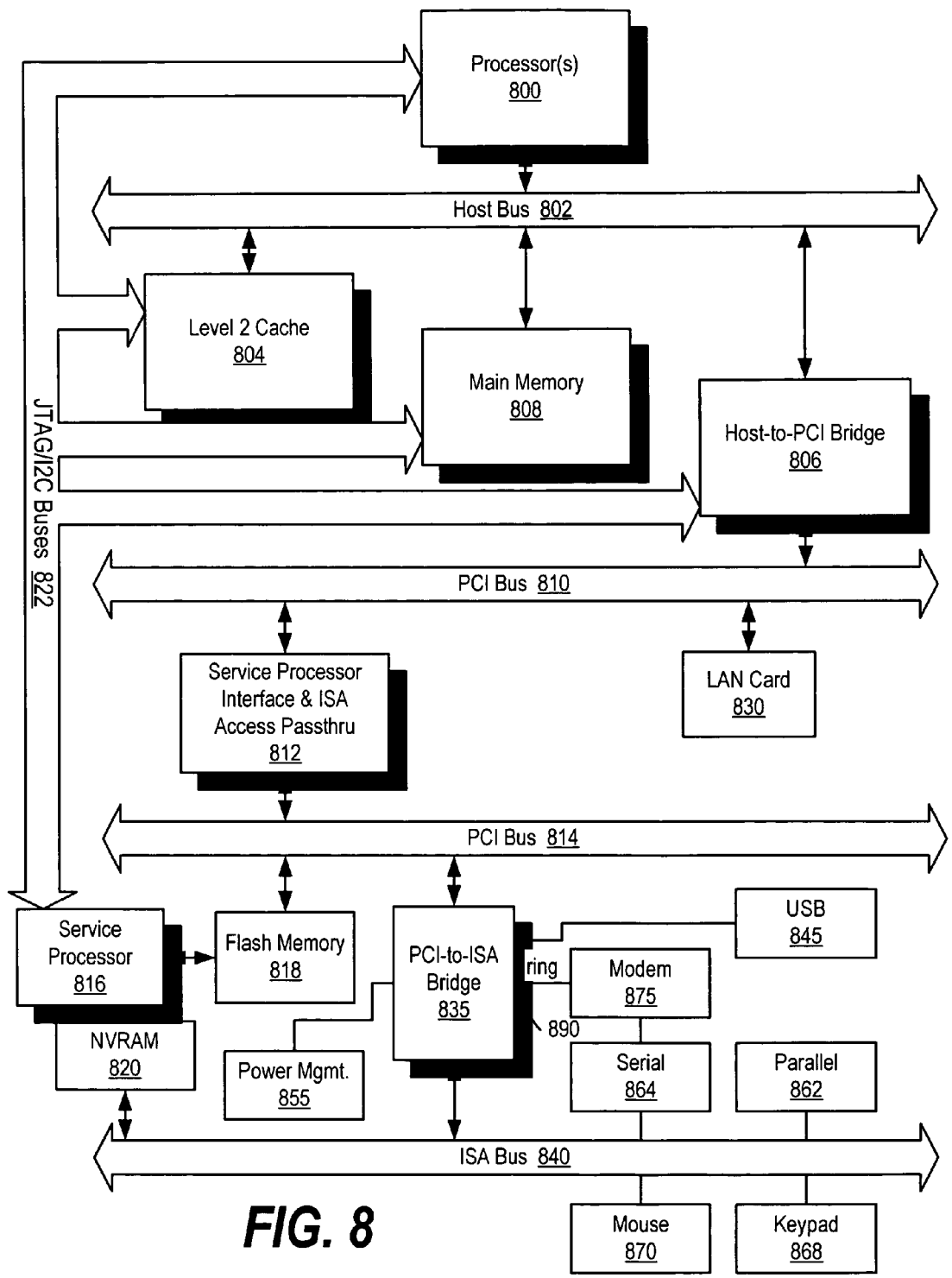
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein. While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

receiving a request from a user, wherein the user previously configured a predetermined alternate keypad arrangement that determines where a plurality of virtual keys are are placed on a virtual keyboard layout, wherein each of the virtual keys is assigned a visual label, and wherein the user previously registered one or more values that correspond with one or more of the virtual keys, wherein at least one of the registered values corresponding to one of the virtual keys is not equal to the visible label assigned to the virtual key;

retrieving, in response to the request, the predetermined alternate keypad arrangement that corresponds to the user and the user-registered values that correspond to one or more of the virtual keys, wherein the alternate keypad arrangement includes the visual labels placed on the virtual keys that are included in the virtual keyboard layout;

displaying the retrieved predetermined alternate keypad arrangement that includes the plurality of virtual keys and their respective visual labels on a display screen;

selecting, by the user, a plurality of the displayed virtual keys;

generating an authentication data based on the values registered for each of the displayed virtual keys selected by the user, wherein one or more of the registered values are not equal to the visual label displayed on the corresponding virtual key selected by the user;

retrieving account information corresponding to the user, the account information including a stored authentication data;

comparing the generated authentication data with the stored authentication data;

authorizing the request in response to the received authentication data matching the stored authentication data; and denying the request in response to the received authentication data not matching the stored authentication data.

* * * * *